United States Patent
Bohling et al.

(10) Patent No.: US 9,828,498 B2
(45) Date of Patent: Nov. 28, 2017

(54) POLYVINYL ACETATE LATEX

(71) Applicant: Rohm and Haas Company, Philadelphia, PA (US)

(72) Inventors: James C. Bohling, Lansdale, PA (US); Kebede Besah, Harleysville, PA (US); Pu Luo, King Of Prussia, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 14/969,087

(22) Filed: Dec. 15, 2015

(65) Prior Publication Data
US 2016/0177081 A1 Jun. 23, 2016

Related U.S. Application Data

(60) Provisional application No. 62/094,115, filed on Dec. 19, 2014.

(51) Int. Cl.

| | | |
|---|---|---|
| C08F 220/56 | (2006.01) | |
| C08L 41/00 | (2006.01) | |
| C08L 43/00 | (2006.01) | |
| C08F 220/04 | (2006.01) | |
| C08F 30/02 | (2006.01) | |
| C08F 130/02 | (2006.01) | |
| C08F 230/02 | (2006.01) | |
| C08L 31/04 | (2006.01) | |
| C08F 218/08 | (2006.01) | |

(52) U.S. Cl.
CPC ............ C08L 31/04 (2013.01); C08F 218/08 (2013.01)

(58) Field of Classification Search
None
See application file for complete search history.

(56) References Cited

U.S. PATENT DOCUMENTS

| | | | |
|---|---|---|---|
| 5,294,686 A * | 3/1994 | Fiarman | C08F 2/38 526/233 |
| 6,046,272 A | 4/2000 | Phung | |
| 2003/0109620 A1 | 6/2003 | Zecha et al. | |
| 2008/0058456 A1* | 3/2008 | Chiou | C08F 2/22 524/457 |
| 2012/0058277 A1* | 3/2012 | Bohling | C08F 2/001 427/385.5 |
| 2015/0191589 A1 | 7/2015 | Cai et al. | |

OTHER PUBLICATIONS

Yilmaz et al. Polymer Science, Chapter 2, p. 35-72, Jan. 23, 2003, ISBN 978-953-51-0941-9.*

* cited by examiner

*Primary Examiner* — Robert T Butcher
(74) *Attorney, Agent, or Firm* — Reid S. Willis

(57) ABSTRACT

The present invention relates to a process for preparing an aqueous dispersion of a vinyl acetate polymer comprising the step of polymerizing vinyl acetate under emulsion polymerization conditions in the presence of a chain transfer agent which is a hypophosphite salt or $X-R^1-SH$, where $R^1$ is a $C_1$-$C_4$ alkyl group and X is sulfonate, hydroxyl, sulfate, phosphate, phosphonate, carboxylic acid or a salt thereof, or $C_1$-$C_3$-alkyl carboxylate. The process provides a way of lowering the viscosity of the vinyl acetate polymer at a given solids content.

5 Claims, No Drawings

POLYVINYL ACETATE LATEX

BACKGROUND OF THE INVENTION

The present invention relates to a polyvinyl acetate latex composition, more particularly, a relatively low viscosity polyvinyl acetate latex composition.

Historically, polyvinyl acetate containing latexes develop high in-process viscosities, which present great challenges to processing and manufacturing. Failure to reduce in-process viscosity often forces latex manufacturers to either use extreme agitation, which may present safety issues in a plant, or to reduce polymer solids, which adds unnecessary cost for shipping and handling. Furthermore, low solid content latexes limit the marketability of the latex. Accordingly, it would advantageous to develop polyvinyl acetate latexes with higher solids and/or lower viscosities.

SUMMARY OF THE INVENTION

The present invention is a process for preparing an aqueous dispersion of a vinyl acetate polymer comprising the step of polymerizing vinyl acetate under emulsion polymerization conditions in the presence of a chain transfer agent which is a hypophosphite salt or $X-R^1-SH$, where $R^1$ is a $C_1$-$C_4$ alkyl group and X is sulfonate, hydroxyl, sulfate, phosphate, phosphonate, carboxylic acid or a salt thereof, or $C_1$-$C_3$-alkyl carboxylate. The process of the present invention provides a way to prepare vinyl acetate homopolymers and copolymers with lower end-of-feed viscosities at a given solids content.

DETAILED DESCRIPTION OF THE INVENTION

The present invention is a process for preparing an aqueous dispersion of a vinyl acetate polymer comprising the step of polymerizing vinyl acetate under emulsion polymerization conditions in the presence of a chain transfer agent which is a hypophosphite salt or $X-R^1-SH$, where $R^1$ is a $C_1$-$C_4$ alkyl group and X is sulfonate, hydroxyl, sulfate, phosphate, phosphonate, carboxylic acid or a salt thereof, or $C_1$-$C_3$-alkyl carboxylate. The vinyl acetate polymer may be a homopolymer or a copolymer; therefore the polymer may be prepared by homopolymerization or copolymerization in the presence of another monomer, such as acrylates and methacrylates including methyl methacrylate, butyl acrylate, ethyl acrylate, ethylhexyl acrylate, and ureido methacrylate; vinyl esters of a branched carboxylic acid monomer, including vinyl versatate; phosphorus acid monomers such as phosphoethyl methacrylate, phosphopropyl methacrylate, and $CH_2=CH-CH_2-(OCH_2CH_2)_n(O)_m-P(O)(OH)_2$, or a salt thereof, where n is from 1 to 5 and m is 0 or 1; and acrylamide monomers and sulfonic acid monomers and salts thereof and combinations thereof including acrylamide, 2-acrylamido-2-methylpropane sulfonic acid or a salt thereof, and vinyl sulfonic acid or a salt thereof.

Preferably, the concentration of vinyl acetate is from 40, more preferably from 50, and most preferably from 60 weight percent, to preferably 95, and more preferably to 90 weight percent based on the weight of total monomers.

A low $T_g$ alkyl acrylate such as butyl acrylate, ethyl acrylate, or ethylhexyl acrylate is preferably included as a comonomer in the polymerization step at a concentration in the range of from 5, more preferably from 8, and most preferably to 10 weight percent, to 50, more preferably to 40, and most preferably to 35 weight percent, based on the weight of total monomers.

When a phosphorus acid monomer is used, it is preferably included at a concentration in the range of from 0.1, more preferably from 0.2 weight percent, to preferably 5, more preferably to 3, and most preferably to 2 weight percent based on the weight of total monomers. A preferred phosphorus acid monomer is phosphoethyl methacrylate (PEM), which is characterized by the following formula:

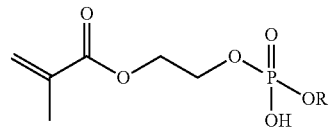

where R is H or

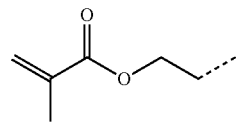

wherein the dotted line represents the point of attachment to the oxygen atom.

2-Acrylamido-2-methylpropane sulfonic acid or a salt thereof or vinyl sulfonic acid or a salt thereof, preferably 2-acrylamido-2-methylpropane sulfonic acid or a salt thereof, is preferably included as a comonomer at a concentration in the range of from 0.1, more preferably from 0.5 weight percent, to 5, more preferably to 3, and most preferably to 2 weight percent, based on the weight of total monomers.

Ureido methacrylate may also be included at a concentration in the range of from 0.1, more preferably from 0.2, and most preferably from 0.5 weight percent, to 5, more preferably to 3, and most preferably to 2 weight percent, based on the weight of total monomers.

Examples of suitable chain transfer agents include sodium and potassium hypophosphite salts, sodium and potassium salts of β-mercaptoethanesulfonate; γ-mercaptopropionic acid and sodium and potassium salts thereof; and β-mercaptoethanol. The chain transfer agent is preferably used at a concentration of from 0.01, more preferably from 0.02, and most preferably from 0.05 weight percent, to preferably 2, more preferably to 1, and most preferably to 0.5 weight percent, based on the total weight of monomers.

It has been discovered that the aqueous dispersion of the vinyl acetate polymer (the PVA latex) prepared by the process of the present invention, preferably the vinyl acetate copolymer, exhibits a lower viscosity in the aqueous phase than comparable vinyl acetate polymers prepared by processes that do not include the specified class of chain transfer reagents. It is believed that hypophosphites and water-soluble alkyl mercaptans reduce the weight average molecular weight ($M_w$) of water-soluble polymers, which accounts for a reduced in-process latex viscosity at constant solids content (or an increased solids content at comparable viscosity) measured against PVA latexes that do not use chain transfer agents within the specified class. Lowering the viscosity in a latex formulation without lowering solids content provides for a more efficient use of water in a latex formulation.

The PVA latex is useful as a binder for coatings compositions, adhesives, or construction materials. For coating compositions, the latex can combined with one or more ingredients selected from the group consisting of pigments such as $TiO_2$, dispersants, defoamers, surfactants, solvents, additional binders, thickeners, extenders, coalescents, biocides, and colorants.

ABBREVIATIONS

| Abbreviation | Name |
| --- | --- |
| BA | Butyl Acrylate |
| VA | Vinyl Acetate |
| AMPS | 2-Acrylamido-2-methylpropane sulfonic acid |
| PEM | Phosphoethyl Methacrylate |
| t-BHP | t-Butyl Hydroperoxide |
| IAA | Isoascorbic Acid |
| UMA | Ureido Methacrylate |
| EA | Ethyl Acrylate |
| MMA | Methyl Methacrylate |
| MAA | Methacrylic Acid |
| NaPS | Sodium Persulfate |
| PS | Particle Size |

EXAMPLES

In the following examples, the average particle size was measured using dynamic light scattering at 90° on a Brookhaven 90Plus Particle Size Analyzer. The viscosity was measured on either a Brookfield DV-II Pro Viscometer or a Brookfield LVTD Viscometer.

Comparative Example 1—Preparation of PVA Copolymer without any Chain Transfer Agent The monomer emulsion was prepared by first mixing DI water (2258 g), PEM (60% active, 230.85 g), NaOH (50%, 151 g), Disponil FES-77 surfactant (185.37 g), TERGITOL™ 15-S-40 surfactant (169.2 g), and dodecylbenzene sulfonate (22.5% aq., 220.35 g) followed by BA (1370.63 g), VA (9810.90 g) and Lubrizol AMPS 2405 (259.7 g).

A 5-gal (19-L) reactor equipped with a mechanical stirrer, nitrogen gas blanket, thermometer, condenser, heating mantel, and temperature controller was charged with DI water (9386.8 g) and heated to 71° C. under $N_2$. To this flask were added Disponil FES-32 surfactant (250.08 g), TERGITOL™ 15-S-40 surfactant (169.2 g), and a solution of $FeSO_4$ heptahydrate (0.36 g) in water (20 g). Co-feed catalyst solution t-BHP (37.1 g) in water (222.6 g) and co-feed activator solution IAA (51.08 g) and sodium acetate (35.67 g) in water (482.18 g) were fed to the flask at a rate of 1.44 g/min, and 2.96 g/min, respectively. Two minutes later, monomer emulsion was fed to the flask at a rate of 64.78 g/min. Ten minutes later, the monomer emulsion feed rate was increased to 129.55 g/min and the reaction temperature was controlled at 71° C. After the monomer emulsion addition was complete, the monomer emulsion vessel was rinsed with DI water (160 g), and the co-feed solutions were continued for an additional 60 min until completion. After the co-feed solutions were complete, a solution of t-BHP (12.36 g) in water (74.21 g) and a solution of sodium bisulfite (15.38 g) in water (161.56 g) were fed separately to the flask at 1.44 g/min and 2.95 g/min, respectively, to reduce the residual monomer. After completion of all feeds, the flask was cooled to room temperature. When the flask was cooled to 50° C., $NH_3$ (52.46 g, 28% aq.) was added to the flask at 10.49 g/min over 5 min, then cooled to 40° C., whereupon a solution of KATHON™ LX bactericide (24.74 g, 1.5%) in water (60 g) was added at a rate of 16.95 g/min over 5 min. After cooled to room temperature, the contents were filtered to remove gel. The filtered dispersion was found to have a solids content of 44.0% and a pH of 6.

Example 1—Preparation of PVA Copolymer Sodium Hypophosphite Chain Transfer Agent The monomer emulsion was prepared by first mixing DI water (2258 g), a sodium hypophosphite solution (26.5 g, 45% aq), phosphoethyl methacrylate (60% active, 230.85 g), NaOH (50%, 151 g), Disponil FES-77 surfactant (185.37 g), TERGITOL™ 15-S-40 surfactant (169.2 g), and dodecylbenzene sulfonate (22.5% aq., 220.35 g) followed by BA (1255.21 g), VA (9810.90 g) and Lubrizol AMPS 2405 (259.7 g).

A 5-gal (19-L) reactor equipped with a mechanical stirrer, nitrogen gas blanket, thermometer, condenser, heating mantel and temperature controller was charged with deionized water (9160 g) and heated to 71° C. while purged with $N_2$. To this flask were added Disponil FES-32 surfactant (250.08 g), TERGITOL™ 15-S-40 surfactant (169.2 g), and a solution of $FeSO_4$ heptahydrate (0.36 g) in water (20 g). Co-feed catalyst solution t-BHP (37.1 g) in water (449 g) and a co-feed solution of IAA (51.08 g) and sodium acetate (35.67 g) in water (482.18 g) were fed to the flask at a rate of 2.7 g/min, and 2.96 g/min, respectively. Two minutes later, monomer emulsion was fed to the flask at a rate of 64.78 g/min. Ten minutes later, the monomer emulsion feed rate was increased to 129.55 g/min and the reaction temperature was controlled at 71° C. 60 min after the start of the monomer emulsion feed, UMA (50% active, 230.84 g) was added to the monomer emulsion. After the monomer emulsion addition was complete, the monomer emulsion vessel was rinsed with DI water (160 g), and the co-feed solutions were continued for an additional 60 min until completion. After the co-feed solutions were complete, a solution of t-BHP (12.36 g) in water (74.21 g) and a solution of sodium bisulfite (15.38 g) in water (161.56 g) were fed separately to the flask at 1.44 g/min and 2.95 g/min, respectively, to reduce the residual monomer. After completion of all feeds, the flask was cooled to room temperature. When the flask was cooled to 50° C., $NH_3$ (52.46 g, 28% aq.) was added to the flask at 10.49 g/min over 5 min. The reactor was cooled to 40° C., whereupon a solution of KATHON™ LX bactericide (24.74 g, 1.5%) in water (60 g) was added at a rate of 16.95 g/min over 5 min. After the reactor was cooled to room temperature, the contents were filtered to remove gel. The filtered dispersion was found to have a solids content of 44.3% and a pH of 6.

Example 2—Preparation of PVA Copolymer with Sodium Hypophosphite Chain Transfer Agent The monomer emulsion was prepared by first mixing DI water (2258 g), a sodium hypophosphite solution (26.5 g, 45% aq), PEM (60% active, 230.85 g), NaOH (50%, 151 g), Disponil FES-77 surfactant (185.37 g), TERGITOL™ 15-S-40 surfactant (169.2 g), and dodecylbenzene sulfonate (22.5% aq., 220.35 g) followed by BA (1255.21 g), VA (9810.90 g) and Lubrizol AMPS 2405 (259.7 g).

A 5-gal (19-L) reactor equipped with a mechanical stirrer, nitrogen gas blanket, thermometer, condenser, heating mantel and temperature controller was charged with deionized water (8100 g) and heated to 71° C. while purged with N$_2$. To this flask were added Disponil FES-32 surfactant (250.08 g), TERGITOL™ 15-S-40 surfactant (169.2 g), and a solution of FeSO$_4$ heptahydrate (0.36 g) in water (20 g). Co-feed catalyst solution t-BHP (37.1 g) in water (449 g) and co-feed solution of IAA (51.08 g) and sodium acetate (35.67 g) in water (482.18 g) were fed to the flask at a rate of 2.7 g/min, and 2.96 g/min, respectively. Two minutes later, the monomer emulsion was fed to the flask at a rate of 64.78 g/min. Ten minutes later, the monomer emulsion feed rate was increased to 129.55 g/min and the reaction temperature was controlled at 71° C. After the monomer emulsion addition was complete, the monomer emulsion vessel was rinsed with DI water (160 g), and the co-feed solutions were continued for an additional 60 min until completion. After the co-feed solutions were complete, a solution of t-BHP (12.36 g) in water (74.21 g) and a solution of sodium bisulfite (15.38 g) in water (161.56 g) were fed separately to the flask at 1.44 g/min and 2.95 g/min, respectively, to reduce the residual monomer. After completion of all feeds, the flask was cooled to room temperature. When the flask was cooled to 50° C., NH$_3$ (52.46 g, 28% aq.) was added to the flask at 10.49 g/min over 5 min. The reactor was cooled to 40° C., whereupon a solution of KATHON™ LX bactericide (24.74 g, 1.5%) in water (60 g) was added at a rate of 16.95 g/min over 5 min. After the reactor was cooled to room temperature, the contents were filtered to remove gel. The filtered dispersion was found to have a solids content of 46.1% and a pH of 6.

Table 1 illustrates the relationship between solids content and the end of the monomer emulsion feed viscosity (EOF) at the polymerization reaction temperature. C1 refers to Comparative Example 1, and 1 and 2 refer to Examples 1 and 2, respectively. PS refers to particle size of the latex particles; EOF refers to end of feed viscosity in centipoise (cP) and was measured using a Brookfield DV-II Pro Viscometer.

TABLE 1

Effect of Sodium Hypophosphite CTA on PVA Latex Copolymer Viscosity

| Ex. # | Solids (%) | PS (nm) | NaH$_2$PO$_3$ (%) | EOF (cP) | Composition |
|---|---|---|---|---|---|
| C1 | 44 | 117 | 0 | 2500 | 85 VA/11.88 BA/2 PEM/1.12 AMPS |
| 1 | 44.3 | 122 | 0.1% | 768 | 85 VA/10.88 BA/2 PEM/1 UMA/1.12 AMPS |
| 2 | 46.1 | 124 | 0.1% | 2240 | 86 VA/10.88 BA/2 PEM/1.12 AMPS |

Table 1 shows that a small addition of sodium hypophosphite causes a marked reduction in EOF at the same solids content and approximately the same particle size, and even a 10% reduction in EOF with a significantly improved solids content (46.1 versus 44% solids).

The PVA latex containing structural units of VA, BA, and AMPS—but without PEM—was also evaluated with and without sodium hypophosphite (NaH$_2$PO$_3$) as shown in Table 2. Comparative Example 2 can be prepared by conventional methods such as described for Comparative Example 1.

TABLE 2

Effect of Sodium Hypophosphite CTA on PVA Latex Copolymer Viscosity

| Ex. # | Solids (%) | PS (nm) | NaH$_2$PO$_3$ (%) | EOF (cP) | Composition |
|---|---|---|---|---|---|
| C2 | 56.2 | 223 | 0 | 22800 | 65.4 VA/34 BA/0.6 AMPS |
| 3 | 56.4 | 218 | 0.1 | 9400 | 65.4 VA/34 BA/0.6 AMPS |

Table 2 illustrates that the viscosity drop at constant solids content is observed for PVA latex copolymers that do not contain phosphorus acid functionalization.

Comparative Example 3—Preparation of a VA Copolymer without a Chain Transfer Agent Monomer emulsion was prepared by first mixing DI water (368.8 g), PEM (60% active, 8.53 g), NaOH (50%, 5.29 g), TERGITOL™ 15-S-9 surfactant (A Trademark of The Dow Chemical Company or Its Affiliates, 17.1 g), Disponil FES-77 surfactant (27.38 g), TERGITOL™ 15-S-40 surfactant (49.93 g), and dodecylbenzene sulfonate (22.5% aq., 32.55 g) followed by BA (570.15 g), VA (1116.78 g) and Na-AMPS (19.1 g).

A 5-L 4-necked round bottom flask equipped with a mechanical stirrer, nitrogen gas blanket, thermometer, condenser, heating mantel and temperature controller was charged with deionized water (900 g) and heated to 71° C. while purged with N$_2$. To this flask was added a solution of FeSO$_4$ heptahydrate (0.1% in water, 18 g), nitrilotriacetic acid (0.1% in water, 15 g) and EA/MMA/MAA pre-form seed (52/47/1, 40 nm particle size, 103.83 g). Co-feed catalyst (t-BHP, 1.51 g) and NaPS (2.27 g) in water (49.5 g) and co-feed activator (IAA, 2.26 g) and NaOH (1.02 g, 50% aq.) in water (50 g) were fed to the flask at a rate of 0.34 g/min. Five minutes later, the monomer emulsion was fed to the flask at a rate of 9.6 g/min. Fifteen minutes later, the monomer emulsion feed rate was increased to 19.2 g/min and the reaction temperature was controlled at 71° C. After the monomer emulsion addition was complete, the monomer emulsion vessel was rinsed with DI water (40 g), and the co-feed solutions feed rates were decreased to 0.25 g/min. Feed was continued for an additional 45 min until completion. A solution of t-BHP (0.48 g) and H$_2$O$_2$ (8.25 g) in water (42 g) and a solution of IAA (5.12 g) and NaOH (2.3 g, 50% aq.) in water (42 g) were fed separately to the flask at 0.85 g/min to reduce the residual monomer. After completion of addition of all feeds, the flask was cooled to room temperature. When the flask temperature reached 50° C., a solution of NH$_3$ (2.9 g, 28% aq.) in water (8 g) was added to the flask dropwise. The flask was cooled to 45° C., whereupon a solution of ROCIMA™ BT 2S bactericide (A Trademark of The Dow Chemical Company or Its Affiliates, 1.87 g, 19.3% aq.) in water (10 g) and a solution of KORDEK™ LX5000 bactericide (A Trademark of The Dow Chemical Company or Its Affiliates, 50%, in 10 g water) was added dropwise. After the flask was cooled to room temperature, the contents were filtered to remove gel. The filtered dispersion was found to have a solids content of 51.42% and a pH of 6.

Examples 4-8 and Comparative Examples 4-6 were carried out substantially as described for Comparative Example 3 except for the inclusion of chain transfer agents of the monomer emulsion in the amounts described in Table 3. Comparative Examples 4-6 show examples of chain transfer agents not within the scope of the present invention.

TABLE 3

The Effect of Various Types of CTAs on PVA Copolymer Latex Viscosity

| Ex. # | Solids (%) | PS (nm) | Concentration/ CTA | EOF (cP) | composition |
|---|---|---|---|---|---|
| 4 | 51.8 | 163.4 | mercapto-ethanesulfonate 0.13%, 13 mmol | 1200 | 65.5 VA/33.44 BA/ 0.56 AMPS/0.5 PEM |
| 5 | 51.4 | 163.9 | mercaptopropionic acid 0.1%, 17 mmol | 2480 | 65.5 VA/33.44 BA/ 0.56 AMPS/0.5 PEM |
| 6 | 51.3 | 164.5 | Sodium Hypophosphite 0.08%, 13 mmol | 3020 | 65.5VA/33.44 BA/ 0.56 AMPS/0.5 PEM |
| 7 | 50.8 | 169.1 | mercaptoethanol 0.07%, 13 mmol | 2440 | 65.5 VA/33.44 BA/ 0.56 AMPS/0.5 PEM |
| 8 | 51.4 | 167.2 | Methyl mercaptopropionate 0.09%, 13 mmol | 3000 | 65.5 VA/33.44 BA/ 0.56 AMPS/0.5 PEM |
| C3 | 51.4 | 168.1 | 0 | 4200 | 65.5 VA/33.44 BA/ 0.56 AMPS/0.5 PEM |
| C4 | 51.6 | 164 | n-Dodecyl mercaptan 0.15% 12 mmol | 3880 | 65.5 VA/33.44 BA/ 0.56 AMPS/0.5 PEM |
| C5 | 51.0 | 166.9 | Chloroacetic acid, sodium salt 0.1% 15.4 mmol | 5100 | 65.5VA/33.44 BA/ 0.56AMPS/0.5 PEM |
| C6 | 51.0 | 166.7 | Bromoacetic acid 0.1%, 13 mmol | 5920 | 65.5VA/33.44 BA/ 0.56 AMPS/0.5 PEM |

The data show that PVA latex copolymers prepared using CTAs within the scope of the present invention exhibit end of feed viscosities that are lower and, in some cases, significantly lower, than comparable copolymers that contain either no CTA (Comparative Example 3) or n-dodecyl mercaptan (Comparative Example 4) or chloroacetic acid, sodium salt (Comparative Example 5) or bromoacetic acid.

The invention claimed is:

1. A process for preparing an aqueous dispersion of a vinyl acetate copolymer comprising the step of polymerizing under emulsion polymerization conditions and in the presence of 0.01 to 1 weight percent of a chain transfer agent:
   a) from 40 to 90 weight percent vinyl acetate,
   b) from 5 to 40 weight percent butyl acrylate,
   c) from 0.2 to 3 weight percent of phosphoethyl methacrylate, and
   d) from 0.1 to 3 weight percent of a sulfur acid monomer selected from the group consisting of 2-acrylamido-2-methylpropane sulfonic acid, a salt of 2-acrylamido-2-methylpropane sulfonic acid, and sodium vinyl sulfonate;
   wherein the chain transfer agent is selected from the group consisting of sodium hypophosphite, potassium hypophosphate, mercaptoethanesulfonate, mercaptopropionic acid, a salt of mercaptopropionic acid, mercaptoethanol, and methyl mercaptoprionate;
   wherein all weights are based on the weight of total monomers.

2. The process of claim 1 wherein the chain transfer agent is sodium hypophosphate at a concentration of from 0.02 to 0.5 weight percent, and the sulfur acid monomer is 2-acrylamido-2-methylpropane sulfonic acid or a salt of 2-acrylamido-2-methylpropane sulfonic acid.

3. The process of claim 1 wherein the chain transfer agent is selected from the group consisting of mercaptoethanesulfonate, mercaptopropionic acid, a salt of mercaptopropionic acid, mercaptoethanol, and methyl mercaptoprionate at a concentration of from 0.02 to 0.5 weight percent, and the sulfur acid monomer is 2-acrylamido-2-methylpropane sulfonic acid or a salt of 2-acrylamido-2-methylpropane sulfonic acid.

4. The process of claim 1 which further comprises from 0.2 to 2 weight percent ureido methacrylate based on the weight of total monomers.

5. The process of claim 1 which further includes the step of combining the vinyl acetate polymer with one or more ingredients selected from the group consisting of pigments, dispersants, defoamers, surfactants, solvents, additional binders, thickeners, extenders, coalescents, biocides, and colorants.

* * * * *